United States Patent Office 2,744,211
Patented May 1, 1956

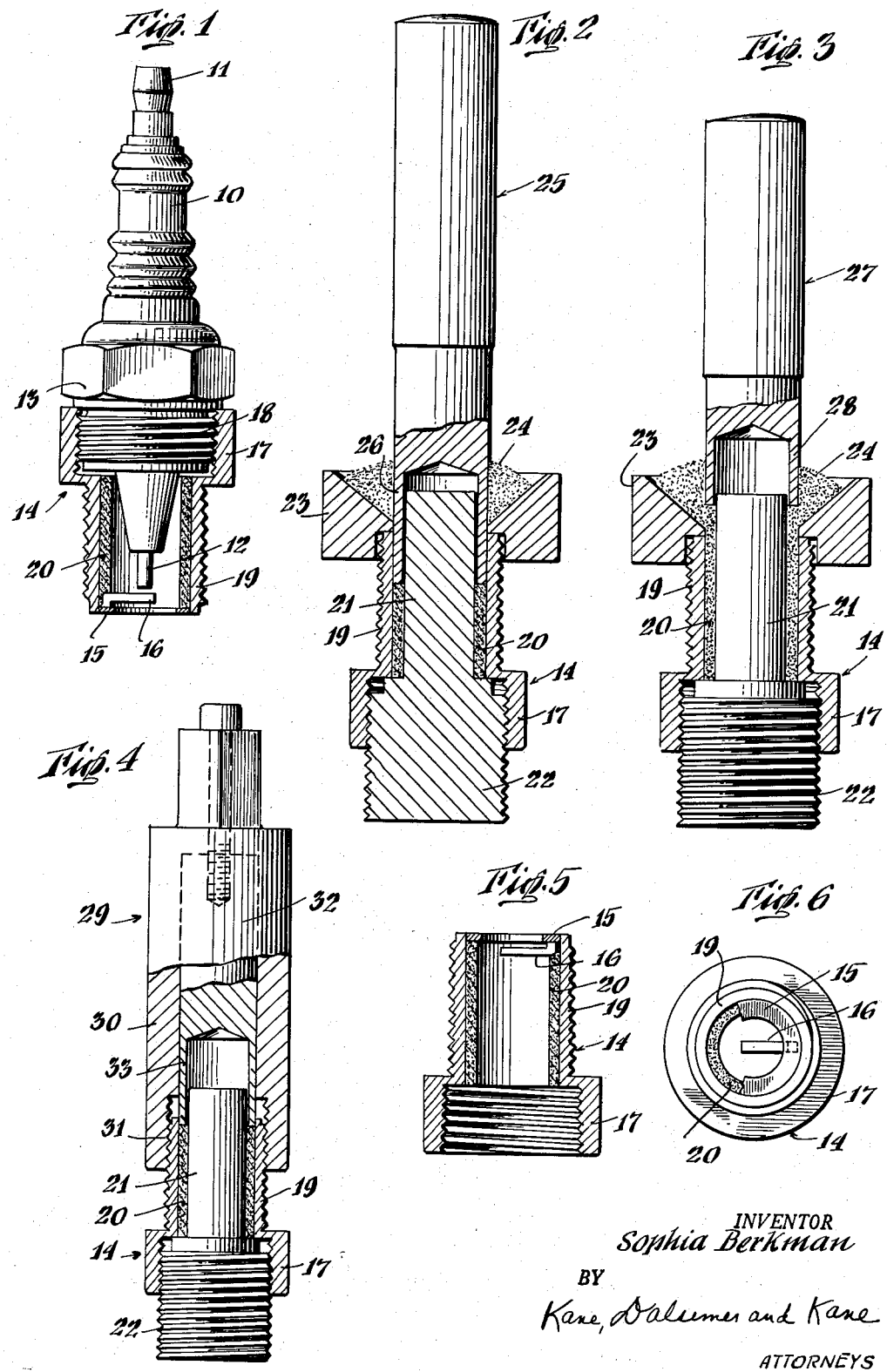

2,744,211

REPLACEABLE CATALYTIC PLUG FOR INTERNAL COMBUSTION ENGINES

Sophia Berkman, New York, N. Y., assignor to Transonic Corporation, New York, N. Y., a corporation of Delaware Application March 10, 1952, Serial No. 275,728

5 Claims. (Cl. 313—143)

This invention relates to an improved replaceable catalytic plug for internal combustion engines.

It has been proposed to provide catalysts of various types inside the cylinder of internal combustion engines. The various proposals heretofore made have not been entirely satisfactory because the catalysts were not stable or were not of the proper type, or difficulty was encountered in properly supporting the catalyst in the cylinders and in replenishing the catalyst when it became desirable to do so.

It is an object of the present invention to overcome these disadvantages and difficulties and to provide an improved device incorporating heterogeneous mineral catalysts of the proper type for internal combustion reactions, which supports the catalysts at the proper position in the cylinder, which is readily applied to the cylinder and can be replaced in a simple manner whenever desired.

In carrying out my invention I incorporate the supply of heterogeneous mineral catalysts in a replaceable plug, preferably a spark plug, which can be readily inserted in the cylinder in the usual manner and replaced when desired. My invention contemplates incorporating the catalyst in the form of a collar or lining inside the metal shell of a spark plug immediately adjacent to the electrodes. By incorporating the catalyst in the spark plug in this fashion, it is located at the point of initiation of combustion and the effectiveness of the catalyst at the critical stage of the combustion, is increased. Also, I have found that there is less tendency for the spark plug to become fouled through carbonization and lead precipitation (where leaded fuels are used) which, in turn, results in better and more efficient engine performance. Since the spark plug is a stationary part, the conditions affecting the catalyst are less drastic then those existing when the catalyst is embedded in the piston with the result that the life of the catalyst is prolonged. The circular ring of catalytic material also is less affected owing to the equalization of pressure on the parts of the catalyst during both compression and firing strokes.

In carrying out my invention, care should be taken in selecting a spark plug of the proper type for the particular internal combustion engine with which it is to be used, as the efficiency of the engine depends to no small extent on the use of the proper type of spark plug. Also, in incorporating the catalytic lining in the shell of the plug, care should be taken not to alter the various factors affecting the efficiency and operation of the plug such as the size of the gap and the relative position of the electrodes inside the cylinder. In the accompanying drawing—

Fig. 1 is an elevational view, with the lower portion shown in section, of a spark plug embodying my invention;

Figs. 2, 3 and 4 are longitudinal sectional views of the shell of the plug showing successive steps in the process of forming the catalytic lining;

Fig. 5 is a similar sectional view of the completed shell having the catalytic lining and electrode incorporated therein; and Fig. 6 is a bottom plan view of the shell with a portion of the electrode supporting ring broken away to reveal the catalytic lining.

My invention is illustrated as incorporated in a spark plug consisting of an insulator body or core 10 having a terminal 11 at its upper end connected to the central electrode 12 projecting from the lower end. The electrical connection (not shown) between the terminal 11 and electrode 12 extends through the center of the insulator body in the usual manner.

Connected to the lower end of the spark plug is a two-piece metal shell indicated by the numerals 13 and 14 having a threaded connection so that the sections can be separated or assembled together when desired. The lower shell portion 14 projects downwardly beneath electrode 12 and has a metal ring 15 secured in the lower end thereof as by having a tight friction fit. The shell sections 13 and 14 and ring 15 are made of metallic materials which are good electrical conductors.

The ring 15 supports electrode 16 which projects inwardly to a point beneath the electrode 12 and is spaced a short distance therefrom so as to provide a spark gap of the proper type. The inside of shell section 14 is provided with a liner 20 made of catalytic material of the type hereinafter indicated.

The insulator body 10, terminal 11, electrode 12 and shell section 13 may be made in the usual manner. The shell section 14 with its liner 20 and electrode 16 may be made in the manner indicated in Figs. 2 to 6 inclusive. Thus, the shell section 14 is first machined or otherwise made in tubular form with upper coupling portion 17 which is internally threaded to engage with the threaded coupling 18 of the shell section 13. Shell section 14 also has the externally threaded mounting portion 19 adapted to engage with the threaded opening of the cylinder for supporting the spark plug.

The lining of catalytic material may be conveniently formed in the shell portion in the manner indicated in Figs. 2, 3 and 4. Thus, a mandrel 21 having a threaded base is screwed into the shell so that the mandrel projects through the mounting portion 19. The diameter of the mandrel is less than the internal diameter of the mounting portion so as to provide a space corresponding to the desired thickness of the lining. A funnel-like tool 23 is then placed over the end of the shell and a finely divided plasticized mass of the catalytic material is placed in the funnel so as to feed downwardly into the gap between the mandrel and the mounting portion of the shell.

A suitable tamping tool 25 having a tubular sleeve 26 of a size to slide over the top of the mandrel 21 and fit into the space between the mandrel and the shell is then used to compress the catalytic mass in the gap or space so as to form a homogeneous, compact lining in the shell free from pores, air gaps, etc. I have found that after the inner portion of the lining has been formed in this fashion and only the outer end remains, it is desirable to shift to a tamping tool 27 such as that shown in Fig. 3 having a relatively shorter tubular sleeve 28. This tool is used in a manner similar to tool 25 to tamp and compress the outer end of the lining.

After the tamping operations have been completed, the tamping tools and the funnel are removed and I use the compression tool 29 shown in Fig. 4 to obtain the final compression of the catalytic material. This tool comprises a supporting jacket 30 having a threaded lower end 31 which engages the shell. Supported inside the jacket is the tool 32 having a tubular sleeve 33 at its lower end also adapted to embrace the mandrel. By screwing the jacket 29 onto the shell 19 the sleeve 33 exerts relatively large compressive force on the catalytic material in the lining insuring a dense, compact although still porous mass.

In forming the lining it is generally made so as to terminate adjacent but a short distance from the outer end of the shell and this may be accomplished in the final compressive action illustrated in Fig. 4. Should the lining completely fill the shell then a small ring of the material should be removed at the outer end of the shell.

When the lining has been thus formed it should be heated with the mandrel still inserted in the shell in an open-flame as, for instance, by a blow-torch to about 1100° or 1200° F. so as to harden the lining into a rock-like mass. In this connection, the heating and the subsequent cooling should be gradual. After cooling the ring 15 carrying electrode 16 is inserted in the outer end of the shell beyond the lining. As previously stated, the ring should have a tight, friction-fit with the shell so as to be firmly held in place. The edge of the shell is then spun over, locking the ring permanently. In addition to serving as a mounting for electrode 16, the ring serves to protect the outer end of the lining. It will be seen that the electrode 16 first projects inwardly from the ring towards the transverse axis of the shell and then radially towards the longitudinal axis of the shell. When the shell is assembled with the spark plug both electrodes are disposed within and protected by the shell. Similarly, the lining 20 is disposed within and protected by the shell and its outer end is protected by ring 15 as well. Since electrode 16 projects inwardly from the ring, clearance should be provided in the lining so as to comfortably accommodate it.

The catalytic material employed is preferably of the type described in my patent application Serial No. 259,127, filed November 30, 1951, for Means for Improving Combustion in an Internal Combustion Engine. Thus, the complex should consist of a finely divided mixture of: (1) minerals serving as catalysts in hydrocarbon decomposition, (2) minerals serving as catalysts in hydrocarbon dehydrogenation, (3) minerals serving as catalysts in oxidation reactions, (4) minerals serving as catalysts in terms of the carbonium ion mechanism, (5) minerals serving primarily as antiknock agents and preferably but not necessarily, (6) minerals serving to contribute activation through emitted electrons i. e. thermo- and photo-luminescent minerals. Minerals of the foregoing types are selected from the following groups of minerals and mixed together as hereinafter explained to produce my heterogeneous mineral complexes:

1. *Minerals—Catalysts in decomposition*

*Carnotite.*—(Utah) ($K_2O.2U_2O_3.V_2O_5 3H_2O$) with uranium oxide as ingredient is an active catalyst in decomposition of hydrocarbons.

*Fluorspar.*—(Tres. Hermanos, New Mexico) ($CaF_2$) (Sp. Gr. 2.97–3.25; H=4; d=3.2 g./cm.² cubic hexaoctahydral).

*Wolframite.*—(Cumberland Pass, Colorado, So. Dakota) ($FeMn\ WO_4$) (Sp. Gr. 7.14–7.54; H=5.5 monoclinic).

*Zircon.*—(St. Peter's Dome, Pikes Peak, Colorado) ($ZrO_2$—$SiO_2$). Zircon on bentonite carrier.

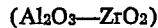

is a cracking catalyst for production of motor fuel of increased octane number.

2. *Minerals—Catalysts in dehydrogenation*

*Apatite.*—(New Mexico, Virginia) ($3Ca_3P_2O_8 CaCl_2$) or ($Ca_5F\ (PO_4)_3$) (Sp. Gr. 3.15–3.37; H=4.5–5; density 3.16–3.22 g./cm², bipyramidal, hexagonal). A phosphate rock containing various rare earth oxides (La, Nd, Pr, Sa, Dy, Yb, Er, Eu) and chiefly thorium and cerium oxides.

*Copper ore.*—(Copper Gulch, Colorado) (Cu) (Sp. Gr. 8.8–8.9; H=2.5–3.0; cubic system). Catalyst in dehydrogenation of paraffins, cycloparaffins and in oxidation of olefins and aromatics.

*Magnetite ore.*—(Fremont, Colorado) ($FeO.Fe_2O_3$) (Sp. Gr. 4.9–5.1; H=5.5–6.5; d=5.0–5.2 g./cm.² compressibility 0.55 dyn$^{-1}$/cm.²; thermal conductivity $K=10^{-7}$ at 400°; cubic system). In the presence of silicates it acts as a dehydrogenation catalyst for cycloparaffins. As iron catalyst it is active in decomposition of hydrocarbons. It is a catalyst for dehydrogenation of paraffins. Under specific conditions it may serve as a potential antioxidant or antiknock. Magnetite produces crystals of the type of spinel ($MgAl_2O_4$). Magnetite is also an oxidation catalyst for aromatics.

*Argosite.*—(Bentonite with montmorillonite as chief ingredient—thermal conductivity $9.5\times10^{-7}$; linear expansion coefficient $19.5\times10^{-7}$ at 100° C.; high reflectivity and emissivity, belongs to the pyrophyllite group rich in water and silicic acid and differs in essential characteristics from kaolin ($Al_2O_3.2SiO_2.2H_2O$) of the halloyosite group). Argosite is an effective catalyst in dehydrogenation of paraffin hydrocarbons. Use of bentonite due to montmorillonite as chief ingredient has been interpreted in its function as a cracking catalyst. Its catalytic activity attributed partly to hydrogen ions which serve to balance the valence and the coordination number within the atomic network containing two different metals and oxygen. The cracking of olefins, paraffins and naphthenes, the dealkylation of aromatic hydrocarbons and isomerization reactions of hydrogen transfer in the presence of this type of bentonite-catalyst has been explained in terms of chain reactions involving the carbonium ion mechanism on account of formation of carbonium ions in a slightly acid medium in the presence of this catalyst. Bentonite as a carrier for metallic oxides improves oxidation-combustion processes. Bentonite with Ni tungstate or nickel sesquioxide plus vanadium pentoxide, chromium trioxide, ferric oxide or molybdenum trioxide serves to improve oxidation processes. Montmorillonite as an Al—Si hydrate with Si content exceeding 70% contains small proportion of iron and alkaline earths and as such has the ability to provoke at once the rupture and branching of the carbon chain of aliphatic hydrocarbons when placed in contact with them. The isomerization occurring thereby is due to the fact that on contact with this type of a clay the aliphatic hydrocarbons dissociate into radicals followed by a regrouping of these with the formation of more branched chains, than originally present in the starting system. On the other hand the active silicates formed in a slightly acid medium by Si—Al hydrates of montmorillonite clay when circulated in contact with petroleum distillates at 400°–500° act as dehydrogenation catalysts. Since any oxidation combustion process may be viewed indirectly as a dehydrogenation process, the use of argosite is, indeed, beneficial and instrumental as a catalyst component of the heterogeneous mineral complexes. The use of suspensions of bentonite-argosite is not advisable due to the possible formation of thixotropic gels and doubtful activity and stability in this form.

3. *Minerals—Catalysts in oxidation reactions*

*Boric acid* ($H_3BO_3$).—Sodium borate (Borax) and chiefly Ulexite, Colemanite, Kernite or Rasorite all serve as oxidation catalysts.

*Ulexite.*—(Chile, Bolivia, Peru)

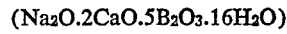

Boric oxide plus clay bentonite is an oxidation catalyst. It also serves to eliminate carbon sedimentation; ($Al_2O_3$—B) or ($TiO_2$—B) similar to ($SiO_2$—$ZrO_2$) and ($SiO_2$—MgO) which are also catalysts in catalytic cracking in terms of the carbonium ion action.

*Colemanite.*—(California and Nevada)

*Kernite or Rasorite.*—(Kern County, California) (29% $B_2O_3$).

*Vanadite ore.*—Riple, Colorado) ($3PbO_3V_2O_8PbCl_2$) (Sp. Gr. 6.7–7.2; H=2.5–3.0; rhombic system). Oxidation catalyst.

*Vanadinite.*—(St. George, Utah) ($9PbO.3V_2O_5.PbCl_2$) (Sp. Gr. 6.7–7.7; H=3 hexagonal system). Oxidation catalyst.

*Molybdite.*—(Climax, Colorado) ($Fe_2O_3.MoO_3.8H_2O$) (Sp. Gr. 4.7–4.8; H=1.0–1.5). Catalyst in oxidation.

*Malachite* ($CuCO_3.Cu(OH)_2$).—Catalyst for oxidation of aromatics and under specific conditions serves to isomerize olefins.

4. Mineral catalysts acting in terms of the carbonium ion mechanism

*Routile.*—(Pablo Beach, Florida) ($TiO_2$) (Sp. Gr. 4.12; H=6–6.5). Especially in the presence of boron ($TiO_2$—B) routile acts in catalytic cracking in terms of carbonium ion mechanism ($TiO_2$—$Mo_2O_3$) is a dehydrogenation catalyst of hydrocarbons boiling in the gasoline range.

Similar in action are:

*Ilmenite* ($FeO.TiO_2$).—(52% $TiO_2$) (Sp. Gr. 4.5; hexagonal system).

*Quatase.*—(Graves Mountain, Georgia, North Carolina). Rutilated quartz.

*Arizonite.*—(North New York) ($Fe_2O_3.3TiO_2$) (pinacoidal class).

*Tremolite.*—(Sudbury, Ontario, Canada)

($CaO.3MgO.4SiO_2$) or ($CaMg_3(SiO_3)_4$)

(Sp. Gr.=2.9–3.2; H=5–6; thermo-luminescent). Catalyst in term of carbonium ion mechanism.

*Zircon.*—(St. Peter's Dome, Pike's Peak, Colorado) ($ZrO_2.SiO_2$) (Sp. Gr. 4.02–4.86; H=7.5; tetragonal prisms). Catalyst in catalytic cracking via carbonium ion. Catalyst in obtaining high antiknock fuel.

5. Minerals acting primarily as antiknocks

*Graphite* (C).—(M. P. 3500° C.). Expansion coefficient $7.8 \times 10^{-7}$ at 40° C. is an antiknock agent and slows down the combustion. Contributes to a steady combustion. It causes catalytic reduction of CO.

*Galena.*—(Monarch Pass, Colorado) (PbS) (Sp. Gr. 7.3–7.6; H=2.5, cubic system). Antiknock agent, photoelectric.

6. Minerals contributing activation through emitted electrons (thermo- or photo-luminescent)

*Willemite* ($2ZnO$—$SiO_2$).—Photo-luminescent (Rhombohedral; H=5.5); being strongly photo-luminescent acts as activator in addition to having regular catalytic properties.

Similar action have:

*Calcite* ($CaCO_3$).—(Sp. Gr. 2.7)

*Magnesite.*—(Delta, Utah) ($MgCO_3$) (Sp. Gr. 2.2–3.2; H=3.5–4.5).

Also, various natural minerals which do not interfere with the action of the catalytic agents may be added or the catalytic minerals themselves should be so selected as to increase the mechanical strength and stability of the complex and to impart natural, rock-like character thereto. Also, as explained in my aforesaid application Serial No. 259,127, by proper selection of ingredients the mass can be made substantially oil and water-proof.

The selected ingredients are thoroughly mixed in a dry state and in finely divided form. To this mixture is then added a sufficient quantity of water to produce a mass of proper plasticity so that it can be inserted through the funnel between the mandrel and shell to form the lining. Thereafter, as explained, the lining is heated with an open flame to the proper temperature so as to cause it to set in a dense compact mass but still retaining a degree of porosity in the form of a synthetic ore. The ring 15 and electrode 16 are then inserted in place. Thereafter, the assembly of the spark plug may be completed.

As pointed out at the beginning of the application, it is important to select a spark plug of the proper type for the particular internal combustion engine. Also, in incorporating the catalytic lining in the shell of the plug care should be taken not to alter the various factors affecting the efficiency and operation of the plug such as the size of the gap and the relative projection of the electrodes into the cylinder of the engine. The spark plug is inserted in the threaded opening in the cylinder head of the internal combustion engine in the usual manner.

It has been found that multiple plugs spaced from each other produce better and more uniform results. If the internal combustion engine is of the type which only utilizes a single spark plug in each cylinder, then a dummy plug omitting the electrodes, but incorporating the catalytic lining, may be inserted preferably at a point in the cylinder spaced from the spark plug.

In operation it will be found that spark plugs embodying my invention allow the use of lower octane rated fuels without increasing knock in the engine and greatly increasing the efficiency of the engine. It will also be seen that the catalyst may be readily inserted in the cylinder and can be readily replaceable when desired. In addition, there is less tendency for the spark plug to become fouled through carbonization and lead sedimentation on the plug which, in turn, results in prolonged life span of the plug and in better and more efficient engine performance. Modifications may of course be made in the illustrated and described embodiment of my invention without departing from my invention as set forth in the accompanying claims.

I claim:

1. A replaceable catalytic spark plug for an internal combustion engine comprising an insulator body, a terminal mounted on said insulator body, an electrode projecting from one end of the insulator body and electrically connected to the terminal, a tubular metallic shell surrounding and spaced from the electrode and the adjacent end of the insulator body, a body containing a catalyst for internal combustion of fuel in the form of a lining in the said shell also surrounding and spaced from the said electrode and the adjacent end of the insulator body, and a second electrode connected to said shell and projecting to a point spaced a short distance from the first mentioned electrode to provide a spark gap, said shell and lining projecting beyond said electrodes so that the electrodes are protected by the shell and so that the spark gap is disposed within the lining.

2. A replaceable catalytic spark plug as set forth in claim 1 in which the catalyst for internal combustion comprises a heterogeneous complex of minerals serving as catalysts in hydrocarbon decomposition, minerals serving as catalysts in hydrocarbon dehydrogenation, minerals serving as catalysts in oxidation reactions, minerals serving as catalysts in terms of the carbonium ion mechanism and minerals serving as antiknock catalysts.

3. A replaceable catalytic spark plug for internal combustion engines comprising an insulator body, a terminal mounted on said insulator body, an electrode projecting from one end of the insulator body and electrically connected to the terminal, a tubular metallic shell surrounding and spaced from the electrode and the adjacent end of the insulator body, a body containing a catalyst for hydrocarbon combustion in the form of a lining in said shell also surrounding and spaced from said electrode and the adjacent end of the insulator body, said lining terminating at a point immediately adjacent but spaced from the end of the shell, a metallic ring mounted in the said end of the shell beyond the end of the lining in electrical contact with the shell and serving to protect the end of the lining, and a second electrode mounted on the ring and projecting to a point spaced a short distance from the first mentioned electrode to provide a spark gap.

4. A replaceable catalytic spark plug as set forth in claim 3 in which the shell and lining project beyond the end of the first mentioned electrode and the second mentioned electrode projects inwardly in a longitudinal direction from the ring towards the transverse axis of the shell and then in a radial direction to a point spaced from the outer end of the first mentioned electrode, said electrodes being positioned entirely within the shell so as to be protected thereby and said spark gap being disposed within the lining in the shell.

5. A replaceable catalytic plug for internal combustion engines comprising a threaded member adaptable for insertion into the cylinder of an internal combustion engine and coated with a catalytic mass in form of a synthetic ore including minerals serving as catalysts in hydrocarbon decomposition, minerals serving as catalysts in hydrocarbon dehydrogenation, minerals serving as catalysts in oxidation reactions, minerals serving as catalysts in terms of the carbonium ion mechanism and minerals serving as antiknock catalysts.

References Cited in the file of this patent
UNITED STATES PATENTS

| | | |
|---|---|---|
| 1,123,017 | Schroter | Dec. 29, 1914 |
| 1,230,795 | Schmidt | June 19, 1917 |
| 1,522,551 | Shepherd | Jan. 13, 1925 |
| 1,523,454 | Shepherd | Jan. 20, 1925 |
| 1,564,906 | Sokal | Dec. 8, 1925 |
| 1,820,878 | Wyckoff | Aug. 25, 1931 |
| 2,028,749 | John et al. | Jan. 28, 1936 |
| 2,128,457 | Fairchild | Aug. 30, 1938 |
| 2,151,432 | Lyons et al. | Mar. 21, 1939 |
| 2,552,555 | Houdry | May 15, 1951 |